United States Patent [19]

Coates

[11] 4,382,990
[45] May 10, 1983

[54] COATING COMPOSITION FOR FIBROUS POLYOLEFIN SHEETS

[75] Inventor: Don M. Coates, Midlothian, Va.

[73] Assignee: E. I. Du Pont de Nemours and Company, Wilmington, Del.

[21] Appl. No.: 276,669

[22] Filed: Jun. 29, 1981

Related U.S. Application Data

[63] Continuation-in-part of Ser. No. 149,577, May 14, 1980, abandoned.

[51] Int. Cl.$^3$ .............................................. B32B 27/00
[52] U.S. Cl. ................................... 428/290; 252/8.6; 427/393.1; 427/393.4; 428/291; 428/341; 428/484; 524/520; 524/912
[58] Field of Search ............... 428/290, 289, 291, 341, 428/484; 427/393.1, 393.4, 393.5, 389.9; 252/8.6; 524/912, 520

[56] References Cited

U.S. PATENT DOCUMENTS

| | | | |
|---|---|---|---|
| 3,151,015 | 9/1964 | Griffith | 428/240 |
| 3,168,426 | 2/1965 | Blackie | 156/306 |
| 3,480,547 | 11/1969 | Van Dyk | 252/12.6 |
| 3,498,826 | 3/1970 | Caroselli et al. | 428/240 |
| 3,713,878 | 1/1973 | Thomas | 427/245 |
| 3,816,229 | 6/1974 | Bierbrauber | 260/455 |
| 3,838,082 | 9/1974 | Sauer | 260/29.6 F |
| 4,076,672 | 2/1978 | Huber et al. | 260/29.2 M |
| 4,082,887 | 4/1978 | Coates | 428/289 |
| 4,113,679 | 9/1978 | Andrascheck et al. | 260/28.5 D |

Primary Examiner—Norman Morgenstern
Assistant Examiner—Thurman K. Page

[57] ABSTRACT

A coating composition, in the form of an aqueous dispersion, which includes a water-insoluble wax, a non-ionic surfactant and a water-insoluble resin, and optionally an antistat, is improved by the inclusion of finely divided particles of polytetrafluoroethylene in the dispersion to provide fibrous polyolefin sheets on which the coating is applied and dried with desirable blood-barrier characteristics. Such coated sheets are suitable for gowns and drapes in operating rooms.

10 Claims, No Drawings

COATING COMPOSITION FOR FIBROUS
POLYOLEFIN SHEETS

CROSS REFERENCE TO PRIOR APPLICATION

This is a continuation-in-part of application Ser. No. 149,577, filed May 14, 1980, now abandoned.

BACKGROUND OF THE INVENTION

1. Field of the Invention

This invention relates to an improved coating composition which imparts superior blood-barrier properties, as well as desirable water-barrier, antistatic and antislip characteristics to a fibrous polyolefin sheet coated therewith. In particular, the invention concerns such a coating composition which contains powdered polytetrafluoroethylene, methods for preparing the coating composition and fibrous polyolefin sheets coated with the coating composition.

2. Description of the Prior Art

U.S. Pat. No. 4,082,887 discloses a coating composition which imparts desirably high water-barrier, antislip and antistatic properties to a fibrous polyolefin sheet coated therewith. Such coated sheets have been used for gowns and drapes in hospital operating rooms. The coating composition of U.S. Pat. No. 4,082,887 is in the form of an aqueous dispersion that contains 10-40% by weight solids. The solids consist essentially of effective amounts of (a) a water-insoluble wax, (b) an antistat, (c) a nonionic surfactant and (d) a water-insoluble binder resin. Example 5 of the patent discloses such a composition which also includes an anionic aqueous dispersion of a fluoropolymer useful as an alcohol repellent. This composition, when coated onto a nonwoven fibrous polyolefin sheet and then dried, is stated to provide the coated sheet with high water-barrier, antistat, antislip and alcohol-barrier properties. However, applicant has found that improvements are needed in the blood-barrier properties of such coated sheets.

SUMMARY OF THE INVENTION

The present invention provides an improved coating composition which when applied to a fibrous polyolefin sheet and then dried provides the coated sheet with improved blood-barrier properties, as well as desirable water-barrier, antistatic and antislip properties. The coating composition is of the general type disclosed in U.S. Pat. No. 4,082,887. The composition is in the form of an aqueous dispersion that contains 10-40% by weight solids. The solids of U.S. Pat. No. 4,082,887 include effective amounts of a water-insoluble wax, an antistat, a nonionic surfactant and a water-insoluble resin binder. However, for the coatings of the present invention, the antistat is not required; it is optional. The improvement of the present invention comprises including in this coating composition an effective amount of finely divided particles of polytetrafluoroethylene which provides improved blood-barrier characteristics to the coated, dried sheet. Usually the amount of polytetrafluoroethylene in the coating composition is at least 10% on a dry solids basis; the preferred amount is in the range of 10 to 35%.

The present invention also provides a fibrous polyolefin sheet coated with the dried, improved coating composition. Preferably, the sheet is a nonwoven sheet comprised of polyolefin film-fibrils, most preferably of polyethylene film-fibrils.

The invention also provides novel processes for preparing the above-described coating composition. In another embodiment, the process includes the steps of (a) forming a molten mixture of the water-insoluble wax and the nonionic surfactant, (b) dispersing the finely divided particles of polytetrafluoroethylene in the molten mixture, (c) adding steam and then liquid water to the thusly prepared dispersion of the particles in the molten mixture to form an aqueous dispersion, and (d) adding the water-insoluble resin binder to the aqueous dispersion. A preferred process for preparing the coating composition includes the steps of (a) forming a molten mixture of the water-insoluble wax and the nonionic surfactant, (b) preparing a slurry of the finely divided particles of polytetrafluoroethylene in an aqueous mixture of the water-insoluble resin binder, and (c) dispersing the slurry in the molten mixture while adding steam and then liquid water. When antistat is desired in the coating composition, it is added after the last-recited step in each of these processes.

DETAILED DESCRIPTION OF PREFERRED EMBODIMENTS

Except for the presence of finely divided particles of polytetrafluoroethylene (and the optional presence of antistat) in the improved coating compositions of the present invention, the present compositions are substantially the same as those disclosed in U.S. Pat. No. 4,082,887. Thus, the present coating composition is in the form of an aqueous dispersion containing 10-40% by weight solids, of which the polytetrafluoroethylene particles amount to 10-35% by weight of the dried coating solids. The other ingredients of the present coating composition comprise the known effective amounts of a water-insoluble wax, an antistat, a nonionic surfactant, a water-insoluble binder resin and the requisite amount of water.

The polytetrafluoroethylene particles for use in the coating composition of the invention are provided in an effective amount to significantly improve the blood-barrier properties of the fibrous polyolefin sheet coated therewith. This improvement is in comparison to similar compositions in which the polytetrafluoroethylene particles are not present. Suitable polytetrafluoroethylene particles include DLX-6000 and "Teflon" 7A, each sold by E. I. du Pont de Nemours and Company of Wilmington, Del. The DLX-6000 product has a density of 2.3 grams/cm$^3$, a melting range of 320° to 340° C., and an average particle size of less than one micron, although the particles may loosely agglomerate to clusters of about 150-micron size. "Teflon" 7A has a particle size of about 35 microns, a density of about 2.2 grams/cm$^3$, and a melting point of about 327° C.

As in the coating composition of U.S. Pat. No. 4,082,887, the water-insoluble wax suitable for use in the coating composition of the invention is capable of being dispersed in water at a concentration of 10%, based on the total weight of wax and water. For dispersion in water, the water-insoluble wax requires only a nonionic surfactant or a mixture of two or more such surfactants in an amount of from 15 to 100% by weight based on the amount of wax. The nonionic surfactant has a hydrophilic-lipophilic balance of from about 6–10. The term "wax" as used herein denotes a substance fulfilling the modern usage definition given on page 721 of "Hackh's Chemical Dictionary", 4th ed., McGraw-Hill Co., NY, 1969.

A preferred wax for the composition of the invention is an ethylene diamine bisamide wax, such as "Kenamide" W-5, sold by Humko-Sheffield of Memphis, Tennessee, or "Advawax"-225 sold by Cincinnati Milacron Chemicals, Inc. of New Brunswick, New Jersey. These waxes are known to be useful as lubricants for thermoplastic and thermosetting resins and provide antiblock, antitack and antistatic properties. However, the level of antistatic properties provided by the wax, when used in a coating composition of the type disclosed herein without another antistat, in orders of magnitude lower than that required for the uses intended for the coated sheets of the present invention. Other waxes suitable for the composition of the invention include: "Advawax" 140 and "Advawax" 240, products of Cincinnati Milacron Chemicals, Inc.; "Mooreflake" 160, a product of Moore and Munger, Inc.; and "Mobilwax" 150 and "Mobilwax" 2305, products of the Mobil Oil Company. The wax is present in the composition of the invention in an effective amount such that when the composition is coated and dried on a nonwoven polyolefin sheet at a desired level of coverage, water-barrier properties are imparted to said sheet. Suitable concentrations of wax are from about 15–40% by weight based on the amount of the resin in the composition.

The coating composition of the invention contains a nonionic surfactant, as disclosed in U.S. Pat. No. 4,082,887. The surfactant has a hydrophilic-lipophilic balance (HLB) of from about 6–10. A HLB lower than 6 results in uneven application of the coating whereas a value higher than 10 causes loss of water resistance. HLB is defined as the percentage weight of the hydrophilic portion of a nonionic emulsifier molecule and is described in "The Atlas HLB System", 4th printing, edited and reprinted from Chemmunique, a publication of Atlas Chemical Industries, Inc. The surfactant should not cause the dispersion of binder resin to coagulate. Among suitable, commercially available, nonionic surfactants are the "Spans", which are mixtures of the esters of the monolaurate, monoleate and monostearate type and the "Tweens", which are the polyoxyethylene derivatives of these esters. The "Spans" and the "Tweens" are products of Atlas Powder Company. A mixture containing 83% by weight of "Span" 80 and 17% by weight of "Tween" 80 will provide an HLB of 6. A mixture containing 46% by weight of "Span" 80 and 54% by weight of "Tween" 80 will provide an HLB of 10.

The surfactant is employed in an amount in the range of 15 to 100% by weight, based on the amount of wax. If surfactant is used in an amount substantially in excess of the above prescribed maximum, foaming of the coating composition and a decrease in the hydrostatic barrier performance of the coating made from the composition can result. It is preferred that the amount of surfactant is just sufficient to effect dispersion of the wax in water.

The coating composition of the present inventions contains, as does the coating composition of U.S. Pat. No. 4,082,887, a water-insoluble binder resin which is capable of wetting the polyolefin sheet (oleophilicity). Whether a particular binder resin possesses the requisite oleophilicity for purpose of the present invention is determined by a test in which an aqueous dispersion of the particular binder resin is diluted to 25% solids and then a film of the diluted resin dispersion is drawn, with a number 16 Meyer rod, onto a candidate substrate. If the resulting wet film is smooth and unbroken and remains intact upon drying, e.g., for three minutes in air at 110° C., the binder resin meets the criterion of "wetting" as used herein. Furthermore, the binder resin should not possess an excessive degree of oleophilicity, i.e., it should not impregnate the substrate under the conditions of the above-described test.

Other requirements for binder resins which are suitable for use in the present coating composition include that the resin not impart tackiness, brittleness or poor adhesion in coatings made therewith. Resins having a glass transition temperature, Tg, in the range of about 20° to 50° C. are usually suitable. Also, the binder resin dispersions suitable for the present invention do not coagulate in the presence of the antistat. A test to determine whether a particular binder resin dispersion possesses this coagulation property can be performed by diluting the particular binder resin dispersion in water to 25% solids by weight, then mixing about 70 parts by weight of the diluted resin dispersion and about 2 parts by weight of the aqueous antistat, and then observing whether coagulation occurs.

The proportion of binder resin employed in the composition of the invention is not critical and will depend upon the particular binder resin being used. In a preferred embodiment the binder resin is present in about 35–80% by weight, based upon the weight of the coating composition when dried. Suitable aqueous dispersions of resins include an ethylene/vinyl acetate copolymer dispersion and an ethylene/methacrylic acid copolymer dispersion as described in U.S. Pat. No. 3,487,036; a dispersion of cross-linked terpolymer of ethyl acrylate/styrene/acrylonitrile having a Tg of 20° C.; a dispersion of cross-linked terpolymer of ethyl acrylate/styrene/acrylonitrile having a Tg of 33° C.; and a dispersion of a copolymer of 85 parts ethylene/15 parts methacrylic acid which has been partially neutralized with potassium hydroxide as described in U.S. Pat. No. 3,264,272. Rohm and Haas "Rhoplex" P-310, an acrylic/vinyl acetate copolymer dispersion resin having a Tg of 25° C. is also suitable. These resin dispersions are usually supplied commercially with about 50% solids by weight. Preferred resins for use in the composition are the two aforementioned terpolymer compositions.

The coating composition of the invention may also contain one or more pigments usually in a concentration in the range of from about 1–10% by weight based upon the weight of the coating composition when dried. Organic and/or inorganic pigments are suitable. Examples of such pigments are those made by E. I. du Pont de Nemours and Company under the names of "Dalamar" Yellow, "Monastral" Blue and "Monastral" Red, which have approximately 29, 37 and 19% solids by weight, respectively.

The antistat, the presence of which is optional in the coating composition of the present invention, is set forth in U.S. Pat. No. 4,082,887 and has the formula $M_nR_{3-n}PO_4$, where M is selected from the group consisting of lithium, sodium, potassium, and ammonium ions; R represents an alkyl group containing 3 to 5 carbon atoms, and n is selected from the integers 1 and 2. A preferred antistat is a mixture of approximately equimolar quantities of potassium dibutyl phosphate and dipotassium butyl phosphate. The antistat is present in an effective amount such that it imparts antistatic properties to the fibrous polyolefin sheet when coated thereon and dried. Suitable amounts of antistat usually are in the range of 0.001–0.005 (oz/yd$^2$) or 0.034–0.17 g/m$^2$ by weight (dry basis), based upon the area of the sheet. Since, ordinarily, the antistat is commercially available as an aqueous solution, the amount of aqueous antistat employed will be dependent upon the concentration of the solution. Too much antistat in the composition will cause a loss of hydrostatic barrier properties and will result in incompatability with the binder dispersion.

The total solids content of the composition of the invention is usually in the range of 10–40% by weight. Solids contents of less than about 10% generally are avoided because they are often difficult to form into stable dispersions and require excessively long drying times. Coating compositions of more than 40% solids usually have high viscosity and are difficult to apply uniformly by air-knife coating.

To form the aqueous dispersions of the coating compositions of the present invention with polytetrafluoroethylene particles dispersed therein required special novel procedures. A process for preparing the coating composition is described in Example 1 below. The process includes the steps of:

(a) forming a molten mixture of the water-insoluble wax and the nonionic surfactant;
(b) dispersing the finely divided polytetrafluoroethylene particles in the molten mixture;
(c) adding live steam and then liquid water to the molten mixture containing the polytetrafluoroethylene particles to form an aqueous dispersion;
(d) adding the water-insoluble resin binder to the aqueous dispersion; and
(e) optionally adding the antistat.

A preferred process by which the coating composition of the invention can be prepared is described in detail in Example 2 below and includes the following steps:

(a) forming a molten mixture of the water-insoluble wax and the nonionic surfactant;
(b) preparing a slurry of the finely divided polytetrafluoroethylene particles in an aqueous mixture of the water-insoluble resin;
(c) dispersing the slurry in the molten mixture while adding live steam and then liquid water thereto; and
(d) optionally adding the antistat.

In each of the above described processes, a molten mixture of the wax and surfactant is prepared. In the process described first, the polytetrafluoroethylene particles are dispersed directly into the molten mixtures. This results in the formation of a very thick, viscous dough. A powerful mixer is needed to knead and blend the dough in order to uniformly disperse the particles therein. Because the viscosity of the dough increases with polytetrafluoroethylene content, this method limits the concentration of polytetrafluoroethylene in the final coating composition prepared by this process to no more than about 16% by weight on a dry basis. Within the dispersion step itself, the polytetrafluoroethylene content of the resultant mixture before the step (c) steam and water addition is usually limited to no more than about 60%, based on the total weight of the mixture (before step c). By contrast, in the preferred process described above, the combination of the polytetrafluoroethylene particles/resin-binder slurry with the molten mixture results in viscosities that are relatively low (compared to those of the dough of the first process) and are maintained at such levels by the simultaneous addition of steam while the slurry and molten mixture are being combined. As a result, the concentration of polytetrafluoroethylene particles in the final coating compositions prepared by the preferred process can be 35% or higher, by weight of the final coating composition on a dry basis.

The coating compositions described above can be applied to fibrous polyolefin sheets in a variety of known ways to obtain coated sheets of the invention. For example, the coating composition can be applied to a fibrous polyolefin substrate by air-knife coating, Meyer-rod coating, gravure-roll coating, the kiss-roll method, or the like. Air-knife coating is preferred. When the coating composition is applied to a nonwoven sheet of polyethylene film-fibril elements, it is preferred that the weight of the coating, on a dry basis, be in the range of 1.7 to 3.4 g/m$^2$ (0.05–0.1 oz/yd$^2$). After coating application, the coated substrate is dried at an elevated temperature, such as in a hot air oven. During drying, liquid evaporates from the coating composition, the binder is coalesced and cured, and the binder, polytetrafluoroethylene particles and wax spread uniformly on the surface of the substrate.

It should be noted that in the past, dispersion of polytetrafluoroethylene particles in water presented formidable problems, largely due to the extreme hydrophobicity and high density of the polymer. Prior methods for dispersing such particles generally involved large amounts of powerful surfactants. However, these surfactants also substantially negated the desired hydrophobic effects of the polytetrafluoroethylene in the dried coating. In fact, some of the commercial aqueous dispersions of polytetrafluoroethylene contained so much surfactant that the dried coatings actually became hydrophilic. Adding to these past difficulties, the high density of the polytetrafluoroethylene particles causes accelerated settling out of the particles in water, which makes the dispersions unusable for practical coating operations. In contrast, in the dispersions of the compositions of the present invention, the solids remain well dispersed for many hours and are readily redispersed by simple mixing without requiring excessive and undesirable quantities of powerful surfactants.

There are two reasons why the presence of antistat is optional, rather than required, in the coating of the present invention. Firstly, the blood barrier properties of sheets coated with compositions of the present invention without antistat present in the coating are insignificantly different from those coated with compositions that include the antistat in it. Secondly, even when antistatic protection is desired for sheets coated with compositions of the invention, as in operating-room surgical drapes, the antistat can be applied separately from the coating. For example, the coating of the invention (not containing antistat) can be applied to one side of the sheet and the antistat can be applied to the other side of the sheet. This method is illustrated in Example 3 below.

Fibrous polyolefin sheets which can be coated with the present composition include nonwoven sheets of linear polyethylene, blends of linear polyethylene and minor amounts of branched polyethylene, polypropylene, polybutene, and polyisobutylene. The nonwoven sheet can be composed of continuous filaments, staple fibers or fibrillated films. A preferred substrate is a nonwoven sheet of film-fibril elements of polyolefin, most preferably of linear polyethylene. Nonwoven sheets of film-fibril elements of polyolefin can be prepared by the process of U.S. Pat. No. 3,169,899. Coated sheets of the invention comprising nonwoven sheets of film-fibril elements of polyethylene coated with the composition of the invention possess high blood-barrier properties, in addition to desirable water-barrier, antistatic, antislip, softness and aesthetic properties, thereby making the coated sheets highly suited for use in hospital operating-room gowns.

Antistat protection provided by a coating prepared from a composition of the invention can be determined by submitting a coated sample which was previously conditioned at least 24 hours at 23.9° C. (75° F.)/55% R.H. (relative humidity), to test NFPA (National Fire Protection Association) Code 56A, Section 25433, paragrah A, part 3. The result is reported as "Log R" with values of 10.5 or lower representing acceptable antistatic properties and a value of about 9.5 being preferred. The "Log R" value is determined as the average of measurements for several different portions of the coated sample. Water-barrier performance of a coated sample is measured by the "hydrostatic head" test ASTM D-583, paragraph 53A, Method II. The expression "high water barrier" as used herein means a "hydrostatic head" of at least 63.5 cm (25 inches) as measured by this test.

The resistance to blood strike-through can be measured by the following "blood strike-through test". A modified AATCC (American Association of Textile Chemists and Colorists) crockmeter is employed in this test. The head of the unit is fitted with a pair of rubber rollers and weighted with 500 grams. A piece of foam rubber is covered with a plastic film and taped to the frame to form a pad. A blotter (or folded absorbant paper) is placed over the pad. A test specimen, with the coated side up, is then placed on the blotter. One milliliter of synthetic blood is applied to the coated surface of the specimen. The crockmeter is then run for 20 cycles at a rate of one cycle per second, during which the weighted rubber rollers push the synthetic blood into the test specimen. Blood that passes through the specimen is absorbed on the blotter. By determining the weight of the blotter, before and after the test, a measure of the amount of blood strike-through is obtained. The synthetic blood, which has approximately the same surface tension as real blood, consists of 10 grams of "Pontamine" Fast Red 8 BLX (a dye sold by E. I. du Pont de Nemours and Company) and 25 grams of "Acrysol" G110 (a surfactant sold by Rohm and Haas of Philadelphia, Pa.), added to sufficient distilled water to provide one liter of solution.

The following examples illustrate the invention and show the advantage in blood strike-through characteristics of coated sheets of the invention. Unless otherwise specified, the weights given for the amounts of resin binder and pigment added to the coating composition refer to the aqueous dispersions of these ingredients. The amounts of the various ingredients used in each example and comparison are summarized in Tables I through IV.

EXAMPLE 1

A mixture of nonionic surfactants consisting of 680 grams of "Span" 80 and 374 grams of "Tween" 80 was mixed with 3207 grams "Advawax" 240 ethylene diamine bisamide wax and heated to a temperature in the range of 115° to 120° C. The wax-surfactant mixture melted and formed a homogeneous, amber-colored liquid. With the temperature of the molten mixture maintained at 115° to 120° C. and stirring being provided by a twin-spiral-bladed mixer, 5.348 kilograms of DLX 6000 micronized polytetrafluoroethylene powder was added slowly to the molten mixture. A viscous, dough-like mass resulted. Heating was then stopped and a total of 64.18 kilograms of water were added, initially as live steam and then as liquid water, each at about 100° C. The resulting aqueous dispersion of polytetrafluoroethylene particles was then cooled to about room temperature and provided a base for the remainder of the coating composition.

To the cooled aqueous dispersion, 3.688 kilograms of "Polywax" 2000 micronized polyethylene powder (a product of Petrolite Corp. Bareco Division, of Wayne, Pa.) were added while providing high shear mixing. Then, with the mixing being carried on at low shear, 66.34 kilograms of "Surlyn" 56220 ethylene-methacrylic acid copolymer aqueous latex, 726 grams of "Dowfax" 2A-1 surfactant stabilizer (a product of Dow Chemical Company, of Midland, Mich.), 431 grams of "Nopco" 267A antifoam agent (a product of Diamond Shamrock of Morristown, N.J.), 7.4 kg "Chemcor" 973-A polyethylene binder (a product of Chemical Corp. of America of East Rutherford, N.J.), and 24.2 kilograms of water were added along with pigments consisting of 7.584 kilograms of "Super Imperse" Blue X2688 (a product of Ciba-Geigy of Ardsley, N.Y.), 7.289 kilograms of "Monstral" Red RW768P, and 0.934 kilograms of "Dalmar" Yellow YW768P.

Just prior to coating a substrate with the above-described composition, 2.268 kilograms of a 30% aqueous solution of "Zelec" TY potassium butyl phosphate antistat (a product of E. I. du Pont de Nemours and Company) which had been adjusted to a pH of 9.5 by addition of ammonium hydroxide, were added to the composition to complete the coating formulation.

The coating formulation was applied to a lightly bonded, polyethylene film-fibril, nonwoven sheet (i.e., a "Tyvek" spunbonded olefin sheet product of E. I. du Pont de Nemours and Company) weighing 42.4 grams per square meter (1.25 oz./yd$^2$) at an add-on weight of 1.7 g/m$^2$ (0.05 oz/yd$^2$), on a dry basis. The coated sheet exhibited much better barrier properties against blood strike-through than did other "Tyvek" sheets coated with similar compositions that did not contain polytetrafluoroethylene.

EXAMPLE 2

A slurry was formed from 303 kilograms of "Surlyn" 56220 latex resin, 84.03 kilograms of "Teflon" 7A polytetrafluoroethylene particles and 1.68 kilograms of "Surfynol" 104 acetylenic glycol surfactant (a product of Air Products of Allentown, Pennsylvania) by mixing these ingredients at high speed and high shear. In a separate vessel, a molten mixture was formed at a temperature of 115° to 120° C. from 7.044 kilograms of "Span" 80, 3.81 kilograms of "Tween" 80 and 32.89 kilograms of "Kenamide" W-5 bisamide wax. The slurry was then added, over a 10-minute period, to the molten mixture while simultaneously adding 101.6 kilograms of steam and mixing the mass with a "Lightenin" prop mixer. Mixing was then changed and provided by a high shear, saw-toothed mixer blade. The following were then added: 3.35 kg of "Nopco" 267A, 5.366 kg of "Dowfax" 2A-1, 54.4 kg of "Chemcor" 973A, 584.7 kg of water, 17.1 kg of "Super Imperse Blue" X2668, 17.5 kg of "Monastral" Red RW768P, and 2.27 kg of "Dalamar" Yellow YW718P. Finally, 27.22 kg of the "Zelec" TY solution of Example 1 was added just prior to use of the composition for application to a fibrous polyolefin sheet. The coating composition was then applied to a 42.4-g/m$^2$, lightly bonded "Tyvek" spunbonded olefin sheet with an air-knife coater and dried to provide an add-on weight (dry basis) of approximately 1.7 g/m² (0.05 oz/Yd²).

For the purposes of comparison, a prior art coating composition was made and applied to a similar "Tyvek" sheet. A copolymer of 85 parts ethylene/15 parts methacrylic acid (which had been partially neutralized with potassium hydroxide as described in U.S. Pat. No. 3,264,272) was employed as a binder resin in the form of a 30% solids aqueous dispersion. Although this dispersion as received can coagulate on addition of "Zelec" TY, it was stabilized by addition of a suitable nonionic surfactant and by employing a suitable mixing procedure. The "as received" binder resin dispersion was stabilized by adding to 20 grams of it a solution of 0.5 grams of a surfactant consisting of 65% "Span" 80 and 35% "Tween" 80 in 20 grams of water. The resultant mixture was stirred at moderate speed. After ten minutes, a solution of 2 grams "Zelec" TY and 30 grams of water was added dropwise to the mixture. When addition of the "Zelec" solution was completed, the following ingredients were added in succession: 0.7 grams of "Monastral" Blue; 1.4 grams of "Monastral" Red B; 0.4 grams of "Dalamar" Yellow; 10 grams of "Zepel" 2373B (a 22% solids anionic aqueous dispersion of a fluoropolymer sold by E. I. du Pont de Nemours and Company); and 20 grams of a wax emulsion prepared as described in U.S. Pat No. 4,082,887, column 6, lines 49 through 58, from "Advawax" 225 and "Span" 80 and "Tween" 80 surfactants. This coating is applied in the same manner as the coating of the invention given above in this example.

Both the comparative sample and a sample coated with the coating of the invention (as given in this example) were subjected to the "blood strike-through" test. The product coated with the polytetrafluoroethylene-containing product made according to the invention had a strike-through of 0.029 gram as compared to a 0.155 gram strike-through for the comparison sample.

EXAMPLE 3

The same ingredients and methods as were used in Example 2, were employed in this example, except that (1) the quantities were somewhat different and (2) the antistat, instead of being included in the coating composition, is applied separately to the nonwoven polyolefin film-fibril sheet.

In accordance with the general procedure of Example 2, a dispersion was made of 137.9 kilograms of "Teflon" 7A, 2.04 kilograms of "Surfonyl" 104, 495.7 kilograms of "Surlyn" 56220, 53.98 kilograms of "Kenamide" W-5, 6.35 kilograms of "Tween" 80, 11.57 kilograms of "Span" 80, and 1117.6 kilograms of water. Then, the following were added: 5.58 kilograms of "Nopco" 267A, 4.54 kilograms of "Dowfax" 2A-1, 89.81 kilograms of "Chemcor" 973-A, 49.89 kilograms of "Super Imperse" Blue X2688, 58.97 kilograms of "Monastral" Red RW768P and 19.05 kilograms of "Dalamar" Yellow YE718T. Before applying the coating composition to a 45.8-g/m² lightly bonded, "Tyvek" spun-bonded olefin sheet, "Zelec" TY was applied to the sheet in a sufficient quantity to provide the sheet, when dried, with a log R of less than 9.0 on that side of the sheet. The "Zelec" antistat was applied by a "brush-flicker" method. The "brush-flicker" method involves a solid kiss-roll which rotates in a pan of aqueous antistat. A rotating brush in contact with the kiss-roll picks up antistat and "flicks" it from the bristle tips onto the polyolefin sheet, in a manner similar to spatter painting. While the sheet was still wet from the antistat application, the coating composition was applied by means of an air-knife coater to the dry side of the sheet (i.e., the side opposite from the side on which the antistat had been applied). The coated and antistatted sheet was dried at 200°–230° F. (93°–110° C.) in an air oven. The total add-on weight (dry basis) of the coating and antistat was approximately 1.7 g/m².

Samples of the thusly prepared sheet were subjected to the blood strike-through test. No detectible difference in strike-through was found between these samples and the samples of coated sheet in which the antistat was added directly to the coating composition as in Example 2. Also, complete absence of antistat from the sheet, whether from the coating or from the opposite side of the sheet, insignificantly affected blood strike-through properties.

TABLE I

Coating Composition of Example 1

| Ingredients* | As Added kg | Dry Basis kg | % |
|---|---|---|---|
| Polytetrafluorethylene powder DLX 6000 | 5.348 | 5.348 | 12.8 |
| Water-insoluble Wax "Advawax" 240 | 3.207 | 3.207 | 7.69 |
| Antistat "Zelec" TY | 2.268 | 0.680 | 1.63 |
| Non-Ionic Surfactants | | | |
| "Span" 80 | 0.680 | 0.680 | 1.63 |
| "Tween" 80 | 0.374 | 0.374 | 0.90 |
| Water-Insoluble Resin Latex | | | |
| "Surlyn" 56220 | 66.34 | 20.897 | 50.10 |
| Pigments | | | |
| "Monastral" Red | 7.289 | 1.399 | 3.35 |
| "Dalamar" Yellow | 0.934 | 0.271 | 0.65 |
| "Super Imperse" Blue | 7.584 | 2.154 | 5.16 |
| Other | | | |
| Water | 88.38 | 0 | 0 |
| "Nopco" 267A | 0.431 | 0.431 | 1.03 |
| "Chemcor" 973-A | 7.4 | 2.220 | 5.32 |
| "Polywax" 2000 | 3.688 | 3.688 | 8.84 |
| "Dowfax" 2A-1 | 0.726 | 0.363 | 0.87 |

*Note - All ingredients listed by tradenames are defined in the text.

TABLE II

Coating Composition of Example 2

| Ingredients* | As Added kg | Dry Basis kg | % |
|---|---|---|---|
| Polytetrafluorethylene powder DLX "Teflon" 7A | 84.03 | 84.03 | 31.8 |
| Water-insoluble Wax "Kenamide" W-5 | 32.89 | 32.89 | 12.4 |
| Antistat "Zelec" TY | 27.22 | 8.166 | 3.09 |
| Non-Ionic Surfactants | | | |
| "Span" 80 | 7.044 | 7.044 | 2.67 |
| "Tween" 80 | 3.81 | 3.81 | 1.44 |
| "Surfonyl" 104 | 1.68 | 1.68 | 0.64 |
| Water-Insoluble Resin Latex | | | |
| "Surlyn" 56220 | 303.0 | 95.445 | 36.11 |
| Pigments | | | |
| "Monastral" Red | 17.5 | 3.36 | 1.27 |
| "Dalamar" Yellow | 2.27 | 0.658 | 0.25 |
| "Super Imperse" Blue | 17.1 | 4.856 | 1.84 |
| Other | | | |
| Water | 686.3 | 0 | 0 |
| "Nopco" 267A | 3.35 | 3.35 | 1.27 |
| "Chemcor" 973-A | 54.4 | 16.32 | 6.17 |

TABLE II-continued

Coating Composition of Example 2

| Ingredients* | Amounts Included | | |
|---|---|---|---|
| | As Added kg | Dry Basis kg | % |
| "Dowfax" 2A-1 | 5.366 | 2.683 | 1.02 |

*Note - All ingredients listed by tradenames are defined in the text.

TABLE III

Comparison Composition of Example 2

| Ingredients* | Amounts Included | | |
|---|---|---|---|
| | As Added grams | Dry Basis grams | % |
| "Zepel" 2373B aqueous fluoropolymer dispersion | 10.0 | 2.2 | 16.67 |
| Water-insoluble Wax "Advawax" 225 | 1.71 | 1.71 | 12.96 |
| Antistat "Zelec" TY | 32.0 | 1.002 | 7.59 |
| Non-Ionic Surfactants | | | |
| "Span" 80 | 1.065 | 1.065 | 8.08 |
| "Tween" 80 | 0.575 | 0.575 | 4.36 |
| Binder Resin Latex | 20.0 | 6.0 | 45.48 |
| Pigments | | | |
| "Monastral" Red | 1.4 | 0.269 | 2.04 |
| "Dalamar" Yellow | 0.4 | 0.116 | 0.88 |
| "Monastral" Blue | 0.7 | 0.257 | 1.95 |
| Water | 37.1 | 0 | 0 |

*Note - All ingredients listed by tradenames are defined in the text.

TABLE IV

Coating Composition of Example 3

| Ingredients* | Amounts Included | | |
|---|---|---|---|
| | As Added kg | Dry Basis kg | % |
| Polytetrafluorethylene powder DLX "Teflon" 7A | 137.9 | 137.9 | 31.3 |
| Water-insoluble Wax "Kenamide" W-5 | 53.98 | 53.98 | 12.3 |
| Non-Ionic Surfactants | | | |
| "Span" 80 | 11.57 | 11.57 | 2.63 |
| "Tween" 80 | 6.35 | 6.35 | 1.44 |
| "Surfonyl" 104 | 2.04 | 2.04 | 0.46 |
| Water-Insoluble Resin Latex "Surlyn" 56220 | 495.7 | 156.1 | 35.46 |
| Pigments | | | |
| "Monastral" Red | 58.97 | 11.32 | 2.57 |
| "Dalamar" Yellow | 19.05 | 5.52 | 1.25 |
| "Super Imperse" Blue | 49.89 | 14.17 | 3.22 |
| Other | | | |
| Water | 1,117.6 | 0 | 0 |
| "Nopco" 267A | 5.58 | 5.58 | 1.27 |
| "Chemcor" 973-A | 89.81 | 33.95 | 7.71 |
| "Dowfax" 2A-1 | 4.54 | 1.72 | 0.39 |

*Note - All ingredients listed by tradenames are defined in the text.

I claim:

1. An improved coating composition in the form of an aqueous dispersion that contains 10 to 40% by weight of solids, which solids include effective amounts of a water-insoluble wax, a nonionic surfactant and a water-insoluble resin, the improvement comprising an effective amount of finely divided polytetrafluoroethylene particles which provides a fibrous polyolefin sheet on which the coating composition is applied and dried with improved blood-barrier characteristics.

2. The coating composition of claim 1 wherein the polytetrafluoroethylene particles amount to 10 to 35% by weight of the coating composition, on a dry solid basis.

3. The coating composition of claim 1 wherein
   (a) the water-insoluble wax is dispersible in water at a concentration of 10% by weight based on the total amount of wax and water, and requires for dispersion in water only a nonionic surfactant or a mixture of two or more nonionic surfactants in an amount of at least 15% and not more than 100% by weight based on the amount of wax;
   (b) the nonionic surfactant has a hydrophilic-lipophilic balance in the range of about 6 to about 10 and is present in an amount in the range of about 15 to about 100% by weight based on the amount of wax;
   (c) the water-insoluble binder is capable of wetting a fibrous polyolefin sheet and in the form of an aqueous dispersion, does not coagulate in the presence of an antistat;
   (d) the polytetrafluoroethylene particles amount to 15 to 35% by weight of the dry coating composition.

4. A fibrous polyolefin sheet coated with the composition of claim 1, 2 or 3 and dried.

5. A nonwoven sheet of polyethylene film-fibril elements coated with the composition of claim 1, 2 or 3 and dried.

6. A process for preparing the coating composition of claim 1, 2 or 3 comprising the steps of forming a molten mixture of the water-insoluble wax and the nonionic surfactant, dispersing the finely divided polytetrafluorethylene particles in the molten mixture, adding steam and then liquid water to the molten mixture containing the polytetrafluoroethylene particles to form an aqueous dispersion, and adding the water-insoluble resin binder to the aqueous dispersion.

7. A process for preparing the coating composition of claim 1, 2 or 3 comprising the steps of forming a molten mixture of the water-insoluble wax and the nonionic surfactant, preparing a slurry of the finely divided polytetrafluoroethylene particles in an aqueous mixture of the water-insoluble resin and dispersing the slurry in the molten mixture while adding steam and then liquid water thereto.

8. The coating composition of claim 1, 2 or 3 further comprising an antistat.

9. The process of claim 6 wherein an antistat is added to the aqueous dispersion after the resin binder has been added.

10. The process of claim 7 wherein an antistat is added to the aqueous dispersion after the slurry has been dispersed in the molten mixture.

* * * * *